Patented May 27, 1930

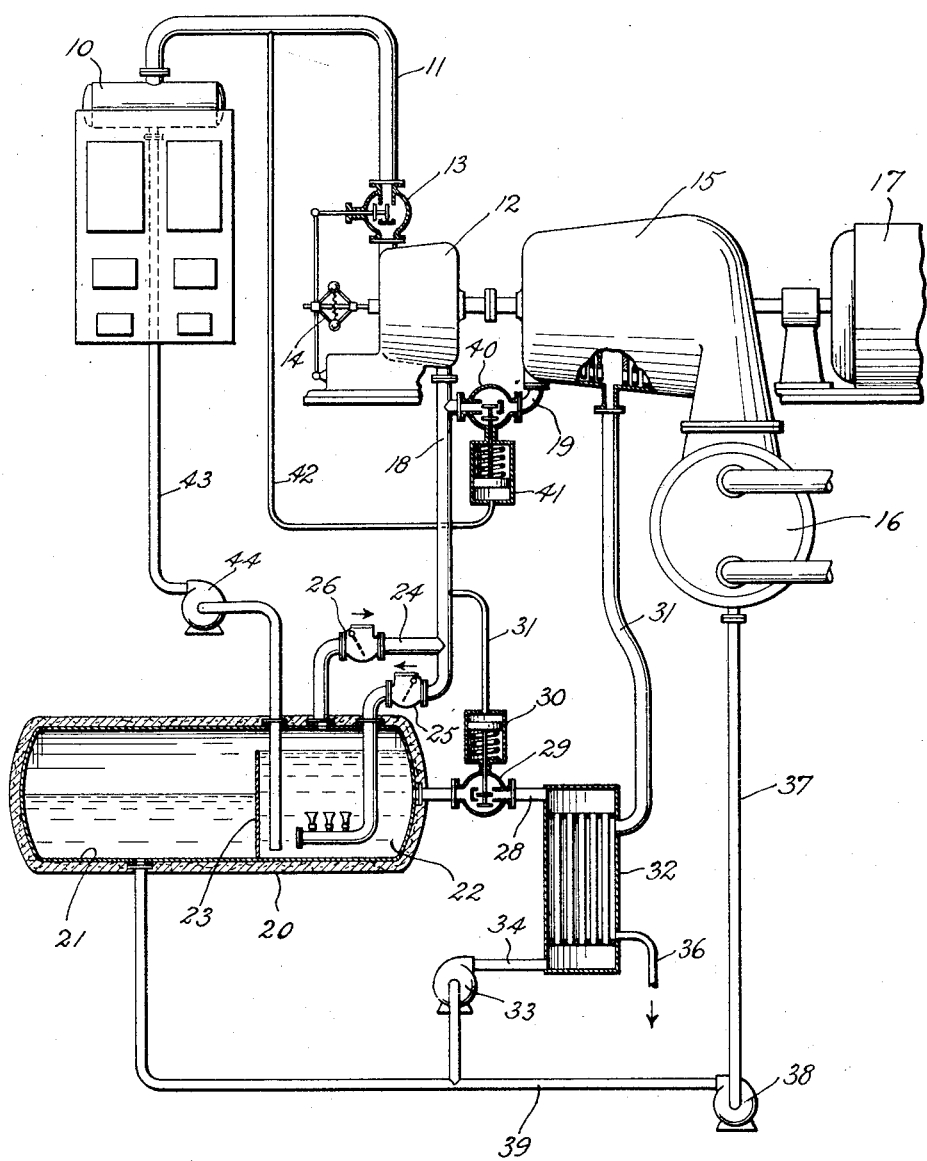

1,760,215

UNITED STATES PATENT OFFICE

JOSEF SMÉKAL, OF JOSEFUV DUL, CZECHOSLOVAKIA

STEAM PLANT

Application filed December 31, 1924, Serial No. 759,164, and in Germany November 9, 1923.

My invention relates to steam plants.

Amongst the objects of my invention are: to provide a novel and highly efficient accumulator plant of the type providing hot water for use in steam generators or to be consumed by other consumers; to provide an accumulator plant in which water is continuously supplied to an accumulator and colder and warmer water is separated and utilized to give the best plant operation; and to provide a novel and efficient equalized steam power plant wherein hot water is accumulated.

Further objects and the nature of the invention will appear from a consideration of the following specification taken in connection with the accompanying drawing showing one form of steam plant arrangement embodying the invention, it being understood that the one form shown is for illustrative purposes and that the invention may be embodied in other forms.

Referring to the drawing, reference character 10 designates a steam generator which may be fired in any suitable way. The steam produced passes through a conduit 11 and into the higher pressure section 12 of a turbine. In conduit 11 is a valve 13 which is controlled by a speed governor 14 responsive to variations of speed of the turbine. It will be understood that any prime mover may be used, a turbine being illustrated by way of example. Governor 14 operates in well known manner in response to variations of the speed of the prime mover to control valve 13 in such a manner so as to make the speed of the prime mover constant. The turbine comprises a lower pressure section 15 which is connected to a condenser 16 and which may drive any type of power receiving element such as an electric generator 17.

Steam after passing through the higher pressure section of the accumulator passes into a conduit 18 and the steam flow is divided, part of the steam passing through conduit 18 to an accumulator 20 and part passing through a connection 19 to the lower pressure section of the turbine 15. It will be understood that connection 19 may be inside the turbine casing.

Accumulator 20 comprises a main accumulator compartment 21 and what I term an accumulator heater 22. The compartment and heater may be arranged separately but they may be, as shown, contained in one accumulator shell being separated by a vertical partition 23, affording communication between the accumulator compartment 21 and accumulator heater 22 only at the top.

Conduit 18 extends into accumulator heater 22 and opens in the water space thereof. A conduit 24 connects the upper part of the accumulator with conduit 18. Non-return valves 25 and 26 are provided to cause flow to take place only in the direction indicated by the arrows.

Cold water, which may be termed feed water, is supplied to accumulator heater 22 through conduit 28. While I say cold water, this water may be relatively warm. It is so cold that it can cause condensation of steam within the accumulator and, therefore, I term it cold water in distinction to hot water which is removed from the accumulator. Accumulator heater 22 is a steam and water contact heater since the steam to be condensed and the water to be heated are in direct contact with each other. In conduit 28 is a valve 29 which is controlled by a regulating member 30 connected by a tube 31 to conduit 18. The regulator is such as to open valve 29 on increase of pressure in conduit 18 and inversely to close valve 29 on decrease of pressure in conduit 18.

A conduit 31 is connected to an intermediate stage of the turbine of relatively low pressure and runs to a closed heater or heating means 32. The cold feed water is pumped by a pump 33 through conduit 34 and through the tubes of the feed water heating means 32 and thence through conduit 28 into the accumulator. The cold water condenses steam in heater 32 and the condensed steam is drawn away through connection 36. The cold water is thus partially heated in heater 32.

The condensate from condenser 16 passes through conduit 37 and is pumped by pump 38 through conduit 39. Some of this water passes to pump 33 and some passes into the lower part of the main accumulator compartment 21.

In connection 19 is a valve 40 which is controlled by a regulator 41 which is connected by a tube 42 with conduit 11. This valve operates to decrease the opening through connection 19 on rise of pressure in conduit 11.

The operation of the plant is as follows:

Suppose that, with the plant operating, and with flow of the respective fluids through the various conduits, there is an increased load on the turbine. This will tend to slow down the turbine, whereupon governor 14 will cause valve 13 to open somewhat in order to supply the additional steam needed for the turbine. The pressure will consequently drop somewhat in conduit 11, assuming the rate of steam generation unchanged. This drop of pressure will be transmitted through tube 42 and will cause valve 40 to be open somewhat, thus passing more steam to the lower pressure section 15. Pressure in conduit 18 acts through tube 31 and operates valve 29 so that water is supplied to the accumulator heater at such a rate as to maintain a constant (that is, practically constant) pressure in conduit 18. Thus it will be seen that the increased load is taken care of in section 15 of the prime mover.

It will be seen that valve 29 operates in accordance with variations of pressure in the accumulator and operates to maintain a constant temperature and pressure in the accumulator since the pressure in conduit 18 and in the accumulator will be the same or substantially the same.

Assume now that the load decreases or that, for other reasons, there is an excess of steam generated. This will cause a rise of pressure in conduit 11. The rise of pressure in conduit 11 will cause valve 40 to close somewhat, thus decreasing the supply of steam to section 15. The closing of valve 40 increases the pressure in conduit 18. Increase of pressure in conduit 18 is transmitted through tube 31 and causes an opening of valve 29. This supplies more cold water to the accumulator heater and more steam is condensed therein, thus again reducing the pressure in conduit 18 and operating to maintain a constant pressure in conduit 18. The surplus steam is thus conducted through conduit 18 and into the accumulator heater 22 where it is condensed. This results in an accumulation of hot water. Assume that the water level is low in compartment 21. A continued excess of steam will cause the water to rise in heater 22. The water can overflow partition 23 and become accumulated in compartment 21.

Water may be conducted to the steam generator by means of conduit 43 and pump 44. Obviously the hot water may be used in any way.

If there is a demand for steam exceeding the generation, so that valves 13 and 19 open wide, the pressure will drop in conduit 18. This decided drop of pressure in conduit 18 causes valve 29 to close completely. The cold water will, therefore, not be admitted through conduit 28 into the accumulator heater. In this case the water flows out of conduit 39 and into the bottom part of accumulator compartment 21. A drop of pressure in conduit 18 of decided degree will cause steam to flow through conduit 24 to make up the definciency. In such case it is undesirable to have the cold water enter the accumulator to mix with the steam. The present arrangement introduces the cold water at the bottom of the accumulator compartment 21 at such time and the water therein stratifies. The hot water will stay on top and the cold water will be at the bottom; thus, the entrance of cold water into the accumulator will not affect the withdrawal of steam. Should the water rise in compartment 21, the first water to overflow partition 23 will be the hot water. Thus it is possible to have a continuous water supply and yet have an accumulator of the type wherein steam is condensed and hot water accumulated and still provide for withdrawal of steam from the accumulator to make up for a deficiency in steam. This operation, however, is not normal operation, normal operation being that above described in which the valve mechanism tends to maintain constant pressures.

With respect to the terminology of the appended claims, the term source of steam is intended to include any source whether a boiler, a steam conduit or a motor or section of a motor. It will be understood that a whole motor or any part of a motor may be a power element.

It will be seen that valves 29 and 40 with their regulating mechanism together constitute valve mechanism operated by variations of steam pressure in conduit 11 and acting to increase the rate of flow of feed water through heating means 32 when the steam pressure in conduit 11 rises and normally operating to maintain a constant pressure in conduit 11 and steam generator 10.

In accordance with the patent statutes, I have described one arrangement embodying the invention, it being understood that other arrangements falling within the scope of the appended claims are intended to be covered hereby.

What I claim is:

1. In a steam plant, in combination, a source of steam, a power element supplied with steam from said source, an accumulator, heating means, means to conduct steam from an intermediate stage of the power element to the heating means, means to conduct water through the heating means and to the accumulator, means to conduct steam from said source into the presence of said water to condense the steam and produce hot water to be accumulated, automatic means to control the flow of water through the heating means in response to variation of pressure in said source and operating to increase the rate of flow on increase of pressure and means to conduct steam from said accumulator to the power element.

2. In a steam plant, in combination, a steam generator, a power element supplied with steam from said steam generator, an accumulator supplied with steam from said steam generator, heating means, means to conduct steam from an intermediate stage of the power element to the heating means, means to conduct water through the heating means and to the accumulator, valve mechanism operated by variations of steam pressure in said generator and acting to increase the rate of flow of said water through the heating means when said steam pressure rises and operating to maintain said steam pressure constant and means to conduct steam from said accumulator to the power element.

3. In a steam plant, in combination, a source of steam, a power element supplied with steam from said source, an accumulator, heating means, means to conduct steam from an intermediate stage of the power element to the heating means, means to conduct water through the heating means and to the accumulator, means to conduct steam from said source into the presence of said water to condense the steam and produce hot water to be accumulated, automatic means to control the flow of water through the heating means and operating to normally maintain a constant temperature of the hot water produced and means to conduct steam from the accumulator to the power element.

4. A steam power plant comprising, in combination, a steam generator, a prime mover comprising a higher pressure section and a lower pressure section, a conduit connecting said steam generator with said higher pressure section, a valve in said conduit, means to regulate said valve in response to speed of said prime mover, an accumulator, a conduit connecting said higher pressure section with said accumulator, a connection for conducting steam from said higher pressure section to said lower pressure section, a regulating valve in said connection operative in response to variations of pressure in the first-mentioned conduit to decrease flow of steam to the lower pressure section on rise of pressure, means to supply relatively cold water to said accumulator, means to control the supply of cold water in accordance with variations of pressure in the steam supplied to the accumulator so as to maintain a constant pressure and temperature in the accumulator and means to conduct water from the accumulator to use.

5. In a steam plant, in combination, a source of steam, a power element supplied with steam from said source, a main accumulator compartment, a steam and water contact heater for producing hot water, feed water heating means, means to conduct steam from an intermediate stage of the power element to said feed water heating means, means to conduct water through said feed water heating means and to said steam and water contact heater and from said heater to said main accumulator compartment, means to conduct steam from said source to said steam and water contact heater and automatic means to control the flow of feed water and operating to normally maintain a constant temperature of the hot water produced.

6. In a steam plant, in combination, a source of steam, a power element supplied with steam form said source, a main accumulator compartment, a steam and water contact heater for producing hot water, feed water heating means, means to conduct steam from an intermediate stage of the power element to said feed water heating means, means to conduct water through said feed water heating means and to said steam and water contact heater, means to conduct steam from said source to said steam and water contact heater, automatic means to control the flow of feed water and operating to normally maintain a constant temperature of the hot water produced and means to circulate water between the main accumulator compartment and the steam and water contact heater.

In testimony whereof I have signed my name to this specification.

JOSEF SMÉKAL.